AUTOMATIC PHONOGRAPH RECORD CHANGER AND PLAYER

Filed Jan. 10, 1945 5 Sheets-Sheet 1

INVENTOR.
MAX S. KARP
BY
Marvin P. Smith
ATTORNEY.

March 21, 1950 M. S. KARP 2,501,391

AUTOMATIC PHONOGRAPH RECORD CHANGER AND PLAYER

Filed Jan. 10, 1945 5 Sheets-Sheet 2

INVENTOR.
MAX S. KARP
BY
Martin P. Smith
ATTORNEY.

AUTOMATIC PHONOGRAPH RECORD CHANGER AND PLAYER

Filed Jan. 10, 1945 5 Sheets-Sheet 3

INVENTOR.
MAX S. KARP
BY
Martin P. Smith
ATTORNEY.

March 21, 1950 M. S. KARP 2,501,391

AUTOMATIC PHONOGRAPH RECORD CHANGER AND PLAYER

Filed Jan. 10, 1945 5 Sheets-Sheet 4

INVENTOR.
MAX S. KARP
BY
Martin P. Smith
ATTORNEY.

March 21, 1950 M. S. KARP 2,501,391

AUTOMATIC PHONOGRAPH RECORD CHANGER AND PLAYER

Filed Jan. 10, 1945 5 Sheets-Sheet 5

INVENTOR.
MAX S. KARP.
BY
Marvin P. Smith
ATTORNEY.

Patented Mar. 21, 1950 2,501,391

UNITED STATES PATENT OFFICE 2,501,391

AUTOMATIC PHONOGRAPH RECORD CHANGER AND PLAYER

Max S. Karp, Los Angeles, Calif.

Application January 10, 1945, Serial No. 572,164

4 Claims. (Cl. 274—10)

My invention relates to an automatic phonograph record changer and player and has for its principal object, to generally improve upon and simplify the construction of the existing forms of similar devices and apparatus and to provide simple and efficient means cooperating in proper sequence, to successively lift disc records from a magazine, grip the elevated record, turn same into playing position, preferably a horizontal plane, in order that it may be conveniently engaged by the stylus carried by the tone arm, turning the record upside down so as to play the reverse side thereof, then turning the record into a vertical position, then returning the record to the magazine and finally shifting said magazine a short distance horizontally, so as to bring the next adjacent record into position to be elevated and then engaged by the arms which turn the records from one position to another.

Further objects of my invention are, to provide an automatic phonograph record changer and player of the character referred to, which is under the control of a normally operable plunger which, if desired, may be associated with a conventional coin controlled device and further, to provide a record handling member comprising a pair of hollow arms carrying and containing essential parts of the record gripping means, also the record rotating means, which arms are mounted for rotation on a horizontal axis, and such rotating being effected in part, by cooperating mutilated gearing.

With the foregoing and other objects in view, my invention consists in certain novel features of construction and arrangement of parts which will be hereinafter more fully described and claimed and illustrated in the accompanying drawings in which:

Figure 1:
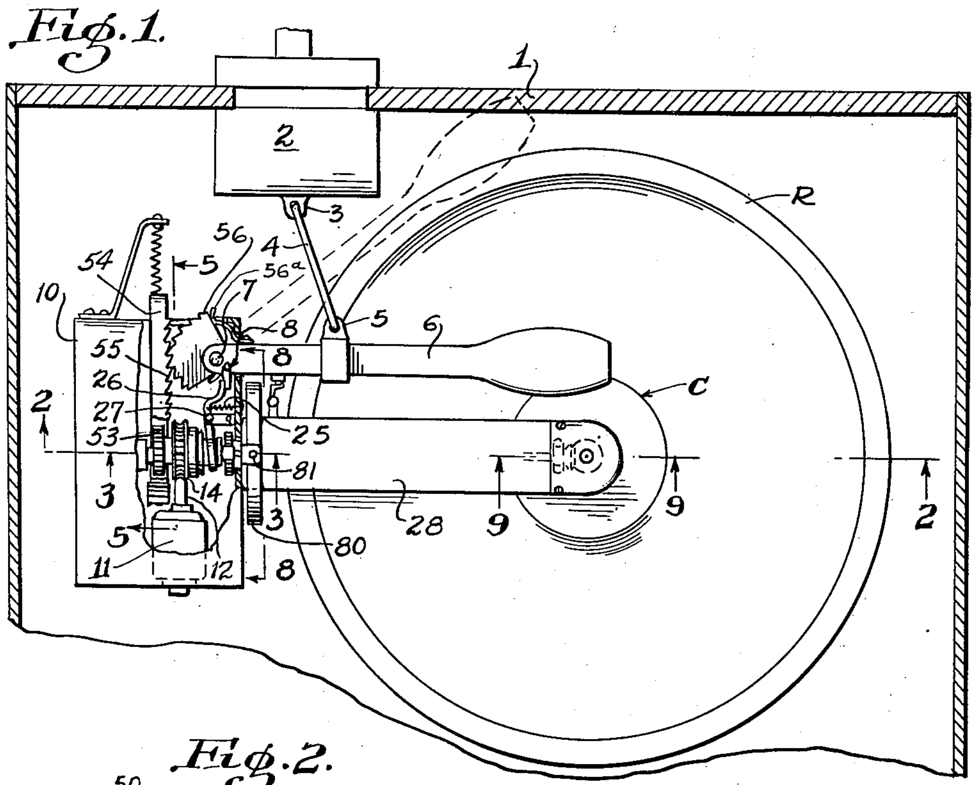
Fig. 1 is a plan view of my improved, automatic record changer, and showing the cabinet or housing in horizontal section.
Figure 2:
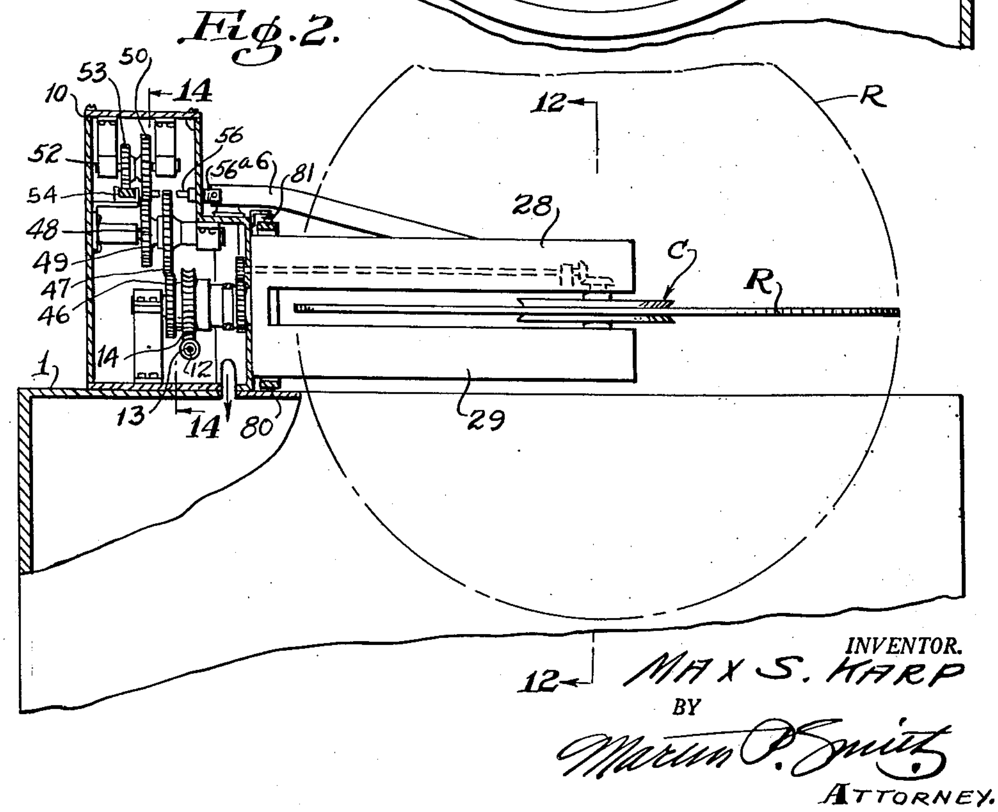
Fig. 2 is a sectional view on the line 2—2 of Fig. 1.

The numeral 1 designates a cabinet of any suitable construction, having a conventional coin controlled unit 2. A slide bar 3 extends from unit 2 into the cabinet and is pivotally connected to a lever 4 that is pivotally connected to a bracket 5 which is slidably mounted on tone arm 6.

The tone arm 6 is pivotally mounted on shaft 7 and carries a lug 8, adapted to throw out a clutch to be later described.

Figures 3, 4, 5, 6, 7, 8:
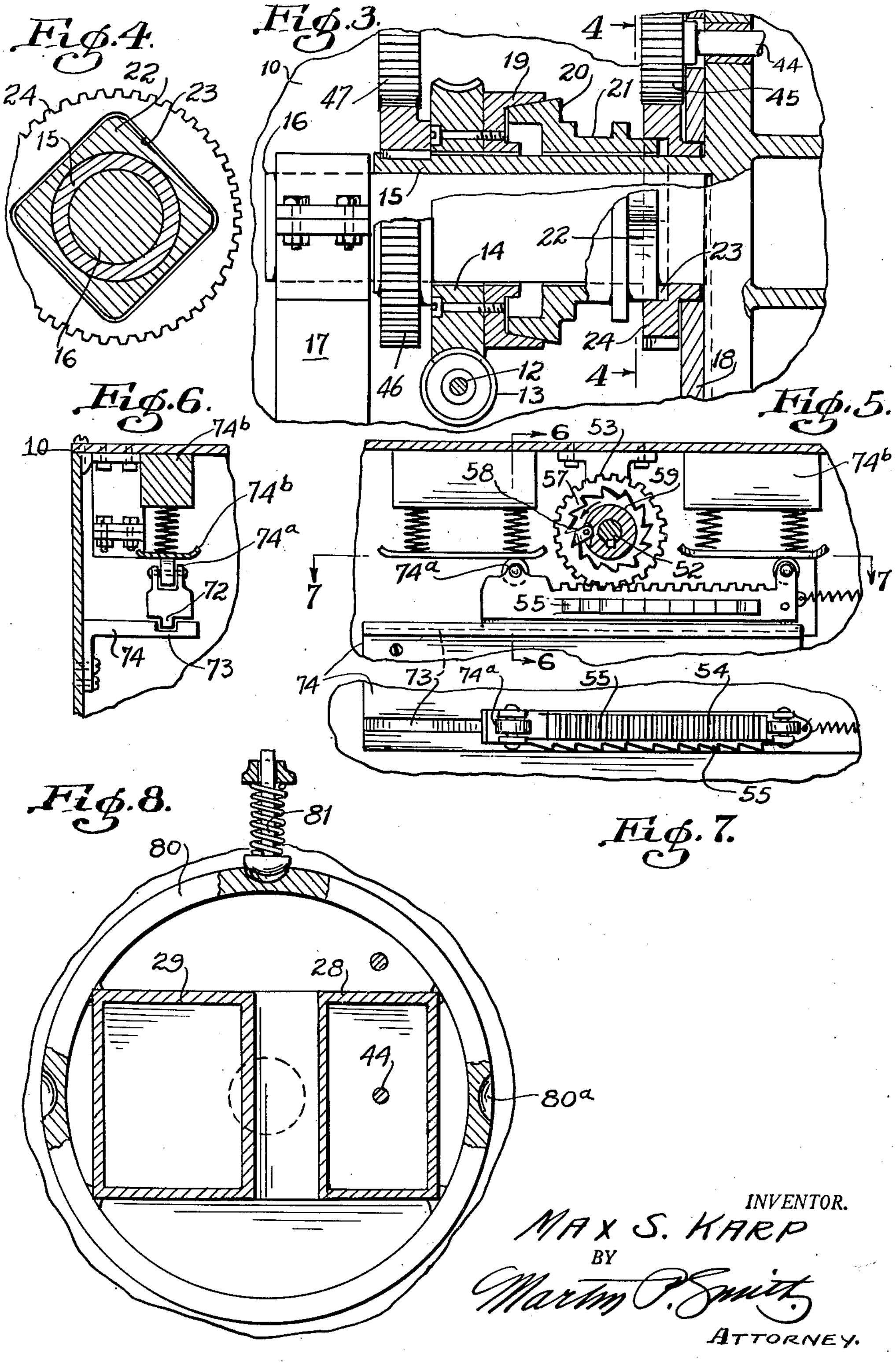
Fig. 3 is an enlarged sectional view taken on the line 3—3 of Fig. 1.
Fig. 4 is a sectional view on the line 4—4 of Fig. 3.
Fig. 5 is an enlarged sectional view on the line 5—5 of Fig. 1.
Fig. 6 is a sectional view on the line 6—6 of Fig. 5.
Fig. 7 is a sectional view on the line 7—7 of Fig. 5.
Fig. 8 is an enlarged sectional view taken approximately on the line 8—8 of Fig. 1.

Mounted in the gear box 10 is a motor 11, having a shaft 12, see Fig. 3, on which is fixed a worm 13. The worm 13 is in gear with worm wheel 14, the latter being freely mounted on a sleeve 15. The sleeve 15 is supported on shaft 16, said shaft being journalled in bearing 17 at one end and terminating in the sleeve at the other end.

The sleeve 15, extends through wall 18 of the cabinet, in the form of a pair of spaced hollow tubular arms for a purpose to be later described.

The worm gear 14 has fixed thereto, a clutch member 19 adapted to be normally in operative position with clutch member 20. The clutch member 20 is provided with the usual collar 21, and terminates in a square portion 22, which is received in a square recess 23 formed in the face of gear 24.

As shown in Fig. 1, when the tone arm 6 is in the position shown in broken lines, the clutch members 19 and 20 will be engaged due to the action of spring 25 swinging clutch yoke 26 about the pivot 27.

Figure 9:
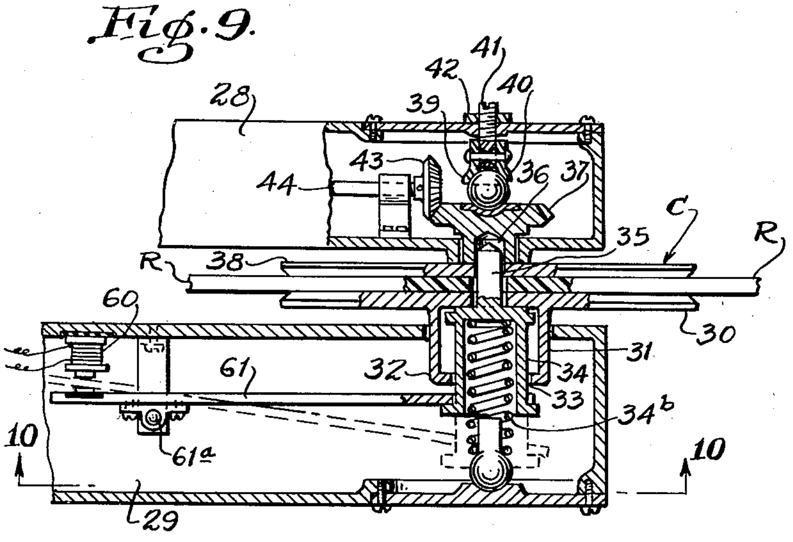
Fig. 9 is an enlarged sectional view on the line 9—9 of Fig. 1.

As shown in Fig. 9, the tubular extensions 28 and 29 of the sleeve 15, extend just beyond the center of a record R, said record being held in playing position by a clamp C.

The clamp C is provided with a retractible plate 30, having an integral sleeve 31 which terminates in an end plate 32 apertured at 33 to receive a spring pressed plunger 34 having a pointed nose 35. The nose 35 normally extends through the central hole in the record R and into a socket 36 formed in a bevel gear 37 fixed to plate 38, which complements plate 30. The gear 37 is adjustably held by a ball 39, seated in a socket 40 which is adjusted by a screw 41 and jam nut 42.

The gear 37 meshes with a bevel gear 43 fixed to a shaft 44 that extends through tube 28 and carries a gear 45 which (see Fig. 3) meshes with gear 24.

Thus it is evident that when the tone arm 6 is in the broken line position of Fig. 1, the clutch members 19 and 20 will engage, permitting the motor 11 thru worm 13, worm gear 14 and gears 24, 45, 43 and 37 to rotate the record R and play the same until the arm 6 reaches the full line position of Fig. 1, at which time the lug 8 will swing yoke 26 about the pivot 27 and disengage the clutch members 19 and 20.

Figures 14, 15:
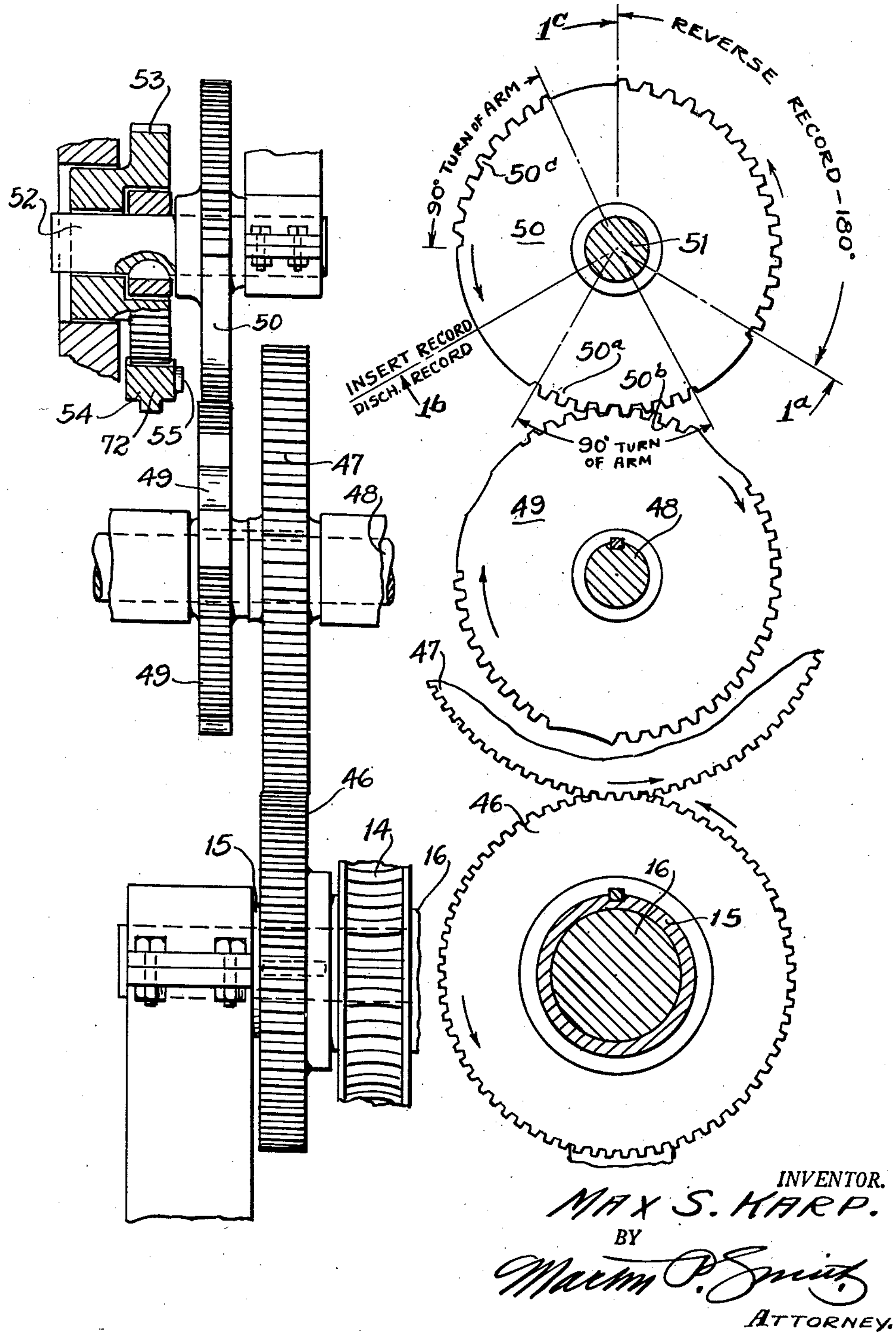
Fig. 14 is an enlarged sectional view taken approximately on the line 14—14 of Fig. 2, and showing the gearing utilized for effecting discharge of the played record and insertion of the next record to be played.
Fig. 15 is a side elevation of the parts shown in Fig. 14.

At this time, the playing of the record is finished and it is necessary to discharge the played record and insert the record next to be played. To accomplish this, it is necessary to turn the record R and its associated parts 90 degrees, and this is done by the parts shown in Figs. 14 and 15. The sleeve 15 (see Fig. 3) has keyed thereto a gear 46 that meshes with a gear 47 carried by a shaft 48, said shaft also carrying partial gear 49. A similar partial gear 50 in intermittent mesh with gear 50 is mounted on shaft 52, which also carries a gear 53 actuated by rack 54, see Fig. 1.

The rack 54 is provided on one face with ratchet teeth 55 engaged by ratchet segment 56, yieldably held to arm 6 by flat spring 56$^a$. As in Fig. 1, the record R has just been played and the coin unit is next utilized to return the arm 6 to the position shown in broken lines. This movement will cause rotation of the segment 56 and move the rack 54 forward. As the rack 54 is in mesh with gear 53 it is evident that gear 53 will be rotated. Since it is desired to rotate the gear 53 only during the forward movement of the rack, the gear is mounted free on the shaft 52 and is formed with ratchet teeth 57 engaged by pawl 58 carried by a sleeve 59 which is keyed to shaft 52.

The partial gears 49 and 50 are designed to provide three different movements for the record R. Firstly, the record just played must be turned 90° so that it may be discharged and a new record inserted; secondly, the new record must be turned 90° to a horizontal position so that one side may be played and thirdly, the record must be turned 180° so that the other side may be played.

The forward movement of the rack is designed to give the gear 50 one third of a turn. The gear 50 is divided into 3 equal sections, that is, 1$^a$ to 1$^b$, 1$^b$ to 1$^c$ and 1$^c$ back to 1$^a$. As gear 50 turns 120° from 1$^a$ to 1$^b$ the teeth 50$^a$ will mesh with teeth 50$^b$ and gear 49 will be turned accordingly. The gear 47 also fixed to shaft 48 is so proportioned as to give the gear 46 and sleeve 15 a 90° turn. Since sleeve 15 carries tubes 28 and 29, clamp C and record R it is evident that the record just played will move to the position shown in Figs. 12 and 13.

Figures 10, 11:
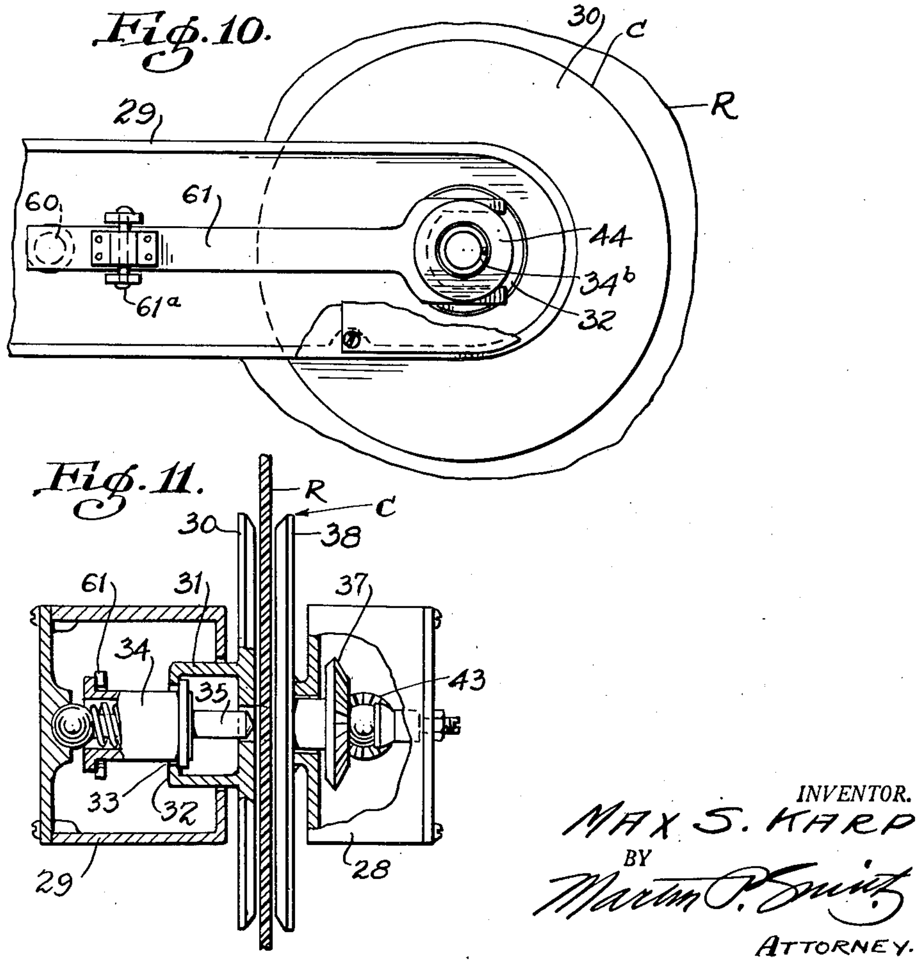
Fig. 10 is an end view of the parts shown in Fig. 9.
Fig. 11 is an enlarged sectional view on the line 11—11 of Fig. 13, with the clamp in released position.

As shown in Figs. 9, 10 and 11, the record R is released from the clamp C by means of a magnet 60, timed to be energized by a timing mechanism (not shown) so as to rotate yoke arm 61 in order to retract sleeve 34 and its nose 35 for the purpose of releasing the record.

A record support 62 is raised by rack 63, actuated by gear 64 of motor 65, in time to receive the record when it is released by clamp C. The motor 65 is now automatically reversed and the record is lowered into an empty compartment 66 of the record magazine 67, to be supported upon rods 68.

The record magazine must now be moved forward so that the next record to be played may be aligned with record support 62.

Figures 12, 13:
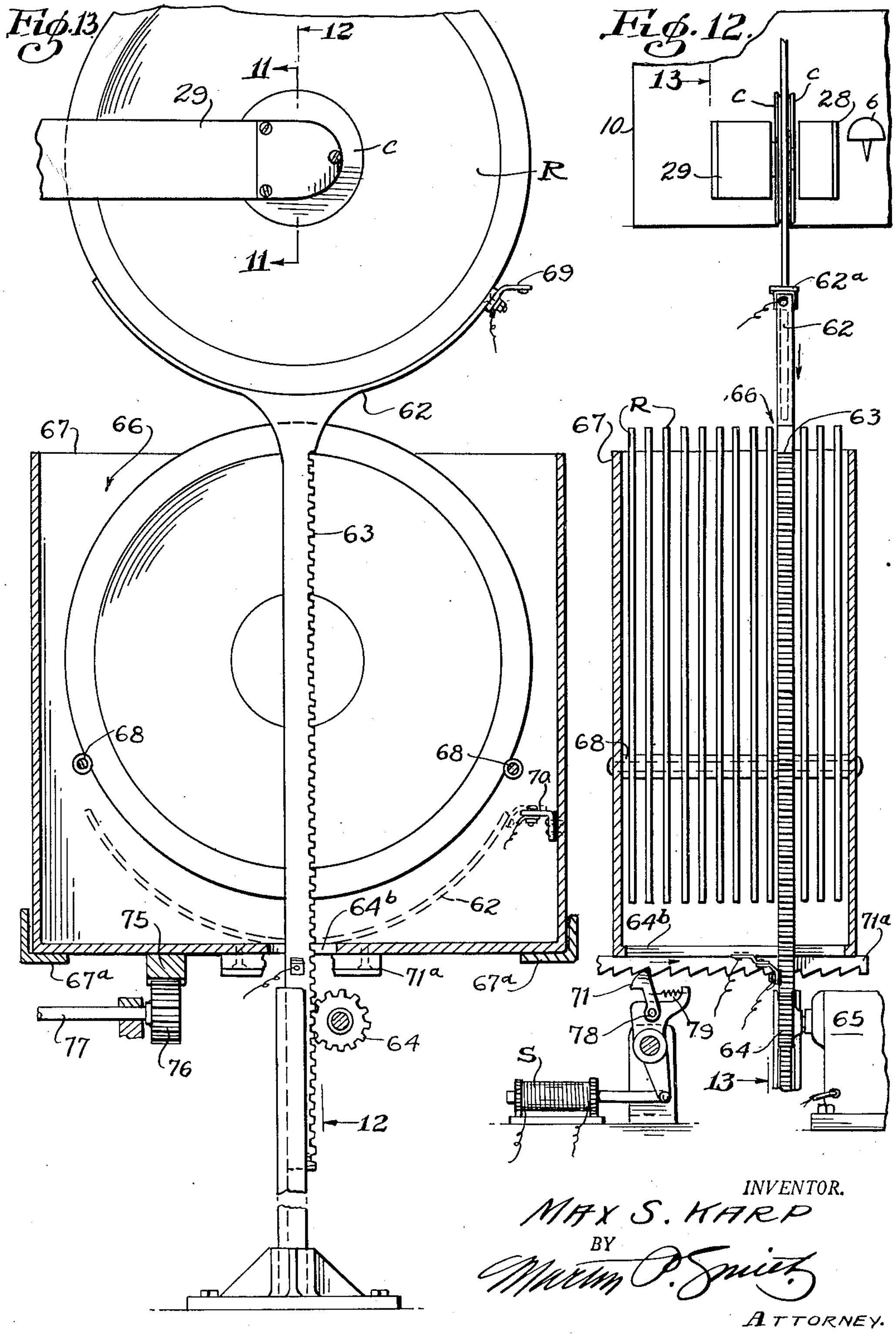
Fig. 12 is a sectional view on the line 12—12 of Fig. 2 and with the record clamping means and record held thereby rotated into vertical position and showing certain parts not appearing in Fig. 2.
Fig. 13 is a sectional view on the line 13—13 of Fig. 12.

The support 62 carries a switch member 69 which contacts switch member 70 when support 62 is in the position shown by broken lines (see Fig. 13). At this time a solenoid operated pawl 71 engages rack 71$^a$ so as to move the magazine 67 the proper distance forward. The motor 65 is so timed that it will now raise record support 62 and thus place a new record in position to be clamped (see Fig. 11).

The timing mechanism will next de-energize magnet 60, see Fig. 9, and permit spring 34$^b$ to move the nose 34$^a$ into clamping position. The clamp C and record R must now be turned 90° so that record R will be in a horizontal or playing position; and the coin unit will again actuate rack 54.

Returning to Fig. 14, it is shown that the section of the gear 50, from 1$^b$ to 1$^c$ provides a gear segment 50$^c$ equal to segment 50$^a$ so that through rack 54, gears 49, 47, 46 and sleeve 15, the record R will be given another 90° turn, thereby placing the same in playing position.

After one side of the record has been played it is necessary to turn the record 180° so that the other side may be played. As in Fig. 14, this movement is provided by the coin unit, which actuates rack 54, to turn gear 50. The section 1$^c$ to 1$^a$ of the gear will turn gear 49 and its associated parts the required distance to give the record a half turn. This completes the operation.

As shown in Figs. 5, 6 and 7, the rack 54 has a key 72 adapted to slide in groove 73 of angle support 74. The rack also has rollers 74$^a$ engaging pressure pads 74$^b$.

The magazine 67 is supported on angle members 67$^a$ and may be returned to its starting position by rack 75 actuated by gear 76 on shaft 77. At this time the rack 71$^a$ will wipe past pawl 71 which is hinged at 78 and held against the rack by spring 79.

Fig. 8 shows means for holding the sleeve 15, tubes 28 and 29, clamp C and record R in the three positions described, by means of a ring 80 carried by the tubes 28 and 29, the ring having recesses 80$^a$ spaced at intervals of 90°–90°–180°, to receive a spring pressed pawl 81, adapted to ride in and out of the recesses.

Thus it will be seen that I have provided an automatic phonograph record changer and player, which is simple in structure, positive in operation and very effective in performing the functions for which it is intended.

It will be understood that minor changes in the size, form and construction of the various parts of my improved phonograph record changer and player may be made and substituted for those herein shown and described, without departing from the spirit of the invention, the scope of which is set forth in the appended claims.

I claim as my invention:

1. In an automatic disc record changer and player, a sliding magazine for holding spaced upright disc records, a rack and pinion actuated record carrier arranged for vertical movement through said magazine for successively engaging and elevating the records therein, a rack and pinion for actuating said magazine, a horizontally disposed bifurcated arm rotatively mounted above said cabinet for receiving the records elevated by said carrier, a driven train of gearing including conjoined mutilated gears for imparting rotary motion to said bifurcated arm, and a spring held magnetically released record clamp on the free ends of said bifurcated arm.

2. The automatic disc record changer and player as set forth in claim 1 and a stylus carrying tone arm mounted for swinging movement over a record when same occupies a horizontal position.

3. The automatic disc record changer and player as set forth in claim 1, with driving connections between said train of gearing and record clamping means on said arm.

4. The automatic disc record changer and player as set forth in claim 1, which record clamp includes a driven rotary member mounted on one part of said bifurcated arm, a spring pressed member on the other part of said bifurcated arm and a magnet actuated member for retracting said spring pressed member.

MAX S. KARP.

REFERENCES CITED

The following references are of record in the file of this patent:

UNITED STATES PATENTS

| Number | Name | Date |
|---|---|---|
| 1,377,027 | Pettit | May 3, 1921 |
| 1,590,654 | Smith | June 29, 1926 |
| 1,968,245 | Bussoz | July 31, 1934 |
| 1,981,175 | Horn | Nov. 20, 1934 |
| 2,298,447 | Wright | Oct. 13, 1942 |
| 2,348,506 | Weaver | May 9, 1944 |

FOREIGN PATENTS

| Number | Country | Date |
|---|---|---|
| 279,696 | Germany | Oct. 27, 1914 |